United States Patent [19]
Markarian et al.

[11] 4,231,076
[45] Oct. 28, 1980

[54] TANTALUM FOIL CAPACITOR WITH STRONG ACID ELECTROLYTE

[75] Inventors: Mark Markarian; Kenneth B. Meyer, both of Williamstown, Mass.

[73] Assignee: Sprague Electric Company, North Adams, Mass.

[21] Appl. No.: 945,981

[22] Filed: Sep. 27, 1978

[51] Int. Cl.$^2$ .......................... H01G 9/00; B01J 17/00
[52] U.S. Cl. .................................. 361/433; 361/272; 29/570
[58] Field of Search ....................... 361/433, 271, 272; 29/570

[56] References Cited

U.S. PATENT DOCUMENTS

| | | | |
|---|---|---|---|
| 3,908,157 | 9/1975 | Ross et al. | 361/433 |
| 4,099,218 | 7/1978 | Klein et al. | 361/433 |
| 4,151,581 | 4/1979 | Bernard et al. | 361/433 |

FOREIGN PATENT DOCUMENTS

| | | | |
|---|---|---|---|
| 834993 | 2/1970 | Canada | 361/433 |
| 2323217 | 4/1977 | France | 361/433 |
| 51-38654 | 3/1976 | Japan | 361/433 |

OTHER PUBLICATIONS

All-Tantalum Wet-Slug Capacitor Overcomes Catastrophic Failure; by Holladay; Electronics Feb. 16, 1978, pp. 105–108.

*Primary Examiner*—Andrew J. James
*Attorney, Agent, or Firm*—Connolly and Hutz

[57] ABSTRACT

A low ESR tantalum foil electrolytic capacitor uses a 30-40 wt % sulfuric acid electrolyte and a porous, synthetic spacer material.

3 Claims, 1 Drawing Figure

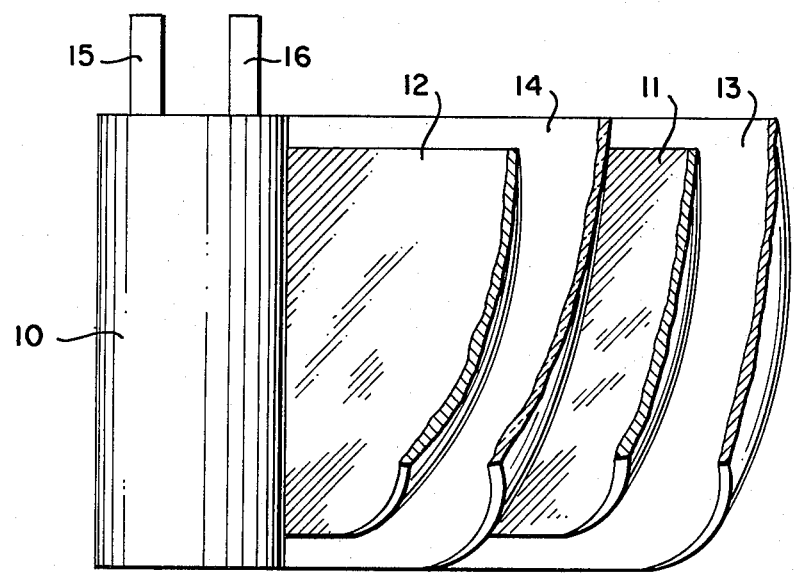

TANTALUM FOIL CAPACITOR WITH STRONG ACID ELECTROLYTE

BACKGROUND OF THE INVENTION

This invention relates to tantalum foil electrolytic capacitors with low equivalent series resistance (ESR). More particularly, it relates to low voltage units which use a strong-acid electrolyte and a spacer fabricated from man-made materials.

Tantalum foil electrolytic capacitors offer the advantages over aluminum electrolytics of a high capacitance to volume ratio, operation over an extended temperature range of about $-55°$ C. to $125°$ C. with a minimum change in capacitance and resistance, and lower equivalent series resistance through the use of lower resistivity electrolytes that are non-corrosive to tantalum. However, tantalum is more expensive than aluminum; thus, a way of reducing the cost of tantalum capacitors would be distinctly advantageous. Current tantalum foil capacitors rated up to 99 VDC utilize kraft paper spacers impregnated with non-strong-acid electrolytes, e.g., ammonium nitrate in DMF or a lithium chloride electrolyte.

SUMMARY OF THE INVENTION

This invention provides a tantalum foil capacitor with a low equivalent series resistance.

The invention also provides a means of reducing foil requirements for a given rating, thus reducing unit size, or of providing units with higher ratings for a given amount of foil (or unit size).

It also provides a tantalum foil capacitor with a lower capacity loss at $-55°$ C. than that of standard units.

These features are realized by replacing the kraft paper by other spacer materials resistant to strong acids, e.g., sulfuric acid, permitting the use of strong acids, that have low resistivity, as electrolytes. Such acids are not compatible with kraft paper and include sulfuric, nitric, trifluoroacetic, chlorosulfonic, etc., and may be mixed with water to give the desired resistivity and operation over an extended temperature range.

Not only is the equivalent series resistance of the capacitors improved, but unexpectedly both a capacity gain is realized and the low-temperature properties are improved. The unexpected gain in capacity provides a means of reducing tantalum foil requirements, and hence capacitor size, for a given rating, or, alternately, providing a capacitor with a higher rating for the same size unit.

The case material must, of course, be resistant to the strong acid of the electrolyte. Stainless steel or tantalum tubes with glass to metal hermetic seals have been used satisfactorily, particularly with the 40% sulfuric acid electrolyte.

BRIEF DESCRIPTION OF THE DRAWING

Referring to the drawing, a capacitor section 10 is shown in a partly unrolled condition. Anode 11 is an etched tantalum foil having an insulating oxide on its surface. Cathode 12 is also a tantalum foil and is preferably etched and has a thin oxide film on its surface for low voltage reversal. Films 13 and 14 are spacers made of porous synthetic material inert to the strong acid electrolyte (not shown). Tabs or wires 15 and 16 are connected to electrodes 11 and 12, respectively, to function as terminals for capacitor section 10 when it is fully assembled.

DESCRIPTION OF THE PREFERRED EMBODIMENT

Low ESR capacitors are preferably made using a woven glass cloth or Celgard 3500 microporous polypropylene film, manufactured by Celanese Corp., as these are not attacked by the electrolyte. Other materials which can be used include porous woven polyolefin cloth, porous perfluoroethylene cloth, polyolefin spun bonded fiber paper, and polypropylene screening. While strong acids such as chlorosulfonic, nitric, trifluoracetic acid, etc., may be used, 30–40 wt % sulfuric acid is preferred, and 40 wt % sulfuric acid most preferred. Although minimum resistivity occurs at 30 wt % concentration for sulfuric acid, the lowest freezing point for aqueous sulfuric acid occurs at 38.58 wt %, namely at $-68°$ C. Since sulfuric, as well as the other strong acids, is hygroscopic, an initial 40 wt % solution is used as both minimums lie below that concentration and any water absorbed will shift the concentration toward those minimums.

In the tables below, average life test data are presented for tantalum foil units using 40 wt % sulfuric acid and the following spacers: 1 mil Celgard 3500 microporous polypropylene film, 3 mil glass cloth, and 2 layers of 0.5 mil kraft paper (control). Capacitance is in microfarads and equivalent series resistance (ESR) is in ohms.

TABLE 1

| | (120 Hz at +85° C.) | | | | | | | | | |
|---|---|---|---|---|---|---|---|---|---|---|
| | 0 hr | | 168 hr | | 500 hr | | 1000 hr | | 2000 hr | |
| Spacer | Cap | ESR | Cap | ESR | Cap | ESR | Cap | ESR | Cap | ESR |
| Celgard | 46.59 | 2.60 | 46.52 | 2.39 | 45.72 | 2.45 | 45.43 | 2.61 | 45.19 | 2.73 |
| Glass | 42.19 | 4.65 | 42.73 | 3.41 | 42.67 | 3.37 | 42.59 | 3.30 | 41.85 | 3.35 |
| Kraft | 38.30 | 4.51 | 37.92 | 4.10 | 37.38 | 4.21 | 37.00 | 4.30 | 35.71 | 4.81 |

TABLE 2

| | (120 Hz at +125° C.) | | | | | | | | | |
|---|---|---|---|---|---|---|---|---|---|---|
| | 0 hr | | 168 hr | | 500 hr | | 1000 hr | | 2000 hr | |
| Spacer | Cap | ESR | Cap | ESR | Cap | ESR | Cap | ESR | Cap | ESR |
| Celgard | 43.98 | 2.59 | — | — | 44.62 | 2.62 | 41.09 | 3.10 | — | — |
| Glass | 41.93 | 4.64 | 42.01 | 3.51 | 41.59 | 3.69 | 41.19 | 3.78 | 40.83 | 4.74 |
| Kraft | 37.54 | 4.66 | 36.19 | 4.71 | 35.61 | 5.64 | 35.11 | 5.64 | 33.35 | 8.98 |

Table 3 below shows room temperature capacitance ($\mu$F.) and that at $-55°$ C. for the above capacitors at 120 Hz and 1 kHz.

TABLE 3

|  | Room Temperature | | −55° C. | | % Change (Room Temp/ −55° C.) | |
|---|---|---|---|---|---|---|
|  | 120 Hz | 1 kHz | 120 Hz | 1 kHz | 120 Hz | 1 kHz |
| Celgard | 46.69 | 41.52 | 38.10 | 35.02 | −18.4 | −15.7 |
| Glass | 42.44 | 33.76 | — | — | — | — |
| Kraft | 38.08 | 32.75 | 21.31 | 9.80 | −44.1 | −70.3 |

What is claimed is:

1. A wound tantalum foil electrolytic capacitor comprising an anodized tantalum foil anode, a tantalum foil cathode, a porous chemically-resistant spacer sheet interposed between said anode and said cathode foils and wound contiguous therewith throughout the entire length of said foils, an aqueous 30–40 wt % sulfuric acid electrolyte in contact with said foils and said spacer throughout the winding, said spacer being chosen from the group consisting of microporous polypropylene film, porous perfluoroethylene cloth, polyolefin fiber paper, porous woven polypropylene, polypropylene screen, and porous woven glass cloth, said capacitor having a low equivalent series resistance and increased capacitance per given length of foil.

2. A capacitor according to claim 1 wherein said electrolyte initially is 40 wt % sulfuric acid.

3. A capacitor according to claim 1 wherein said spacer is a microporous polypropylene film or a woven glass cloth.

* * * * *

UNITED STATES PATENT OFFICE
CERTIFICATE OF CORRECTION

Patent No. 4,231,076        Dated October 28, 1980

Inventor(s) Mark Markarian et al

It is certified that error appears in the above-identified patent and that said Letters Patent are hereby corrected as shown below:

Add the following in Column 3, line 10
-- The experimental units had a higher capacity for the same amount of foil compared to the controls, and the Celgard units showed a significantly smaller capacity loss at -55°C compared to the controls. --

Signed and Sealed this

Thirteenth Day of January 1981

[SEAL]

Attest:

Attesting Officer

SIDNEY A. DIAMOND

Commissioner of Patents and Trademarks